(12) United States Patent
Balini et al.

(10) Patent No.: US 11,912,070 B2
(45) Date of Patent: Feb. 27, 2024

(54) TYRE FOR VEHICLE WHEELS

(71) Applicant: PIRELLI TYRE S.p.A., Milan (IT)

(72) Inventors: Alfredo Balini, Milan (IT); Stefano Bizzi, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 786 days.

(21) Appl. No.: 16/471,698

(22) PCT Filed: Dec. 22, 2017

(86) PCT No.: PCT/IB2017/058342
§ 371 (c)(1),
(2) Date: Jun. 20, 2019

(87) PCT Pub. No.: WO2018/122713
PCT Pub. Date: Jul. 5, 2018

(65) Prior Publication Data
US 2019/0315161 A1 Oct. 17, 2019

(30) Foreign Application Priority Data
Dec. 27, 2016 (IT) .................. 102016000130965

(51) Int. Cl.
*B60C 11/12* (2006.01)
*B60C 11/03* (2006.01)

(52) U.S. Cl.
CPC ...... *B60C 11/1218* (2013.01); *B60C 11/0304* (2013.01); *B60C 11/0306* (2013.01);
(Continued)

(58) Field of Classification Search
CPC . B60C 11/1222; B60C 11/1218; B60C 11/12; B60C 11/1204; B60C 11/1236;
(Continued)

(56) References Cited

U.S. PATENT DOCUMENTS

| 8,544,512 B2 | 10/2013 | Ohashi |
| 2005/0109438 A1* | 5/2005 | Collette .............. B60C 11/1218 425/46 |

(Continued)

FOREIGN PATENT DOCUMENTS

| DE | 102011056427 A1 * | 6/2013 | ......... B60C 11/1281 |
| EP | 1782970 | 5/2007 | |

(Continued)

OTHER PUBLICATIONS

European Search Report from the European Patent Office in corresponding International Application No. EP 20192396, dated Nov. 17, 2020.

(Continued)

*Primary Examiner* — Justin R Fischer
*Assistant Examiner* — Philip N Schwartz
(74) *Attorney, Agent, or Firm* — Finnegan, Henderson, Farabow, Garrett & Dunner, L.L.P.

(57) ABSTRACT

Tyre for vehicle wheels, comprising a tread band comprising circumferential grooves, circumferential ribs defined by said circumferential grooves and a plurality of sipes (10) that extend, on said circumferential ribs, from a radially outer surface of the tread band towards a radially inner portion of the tread band. Said sipes (10) extend along a predetermined trajectory and comprise, in any cross section perpendicular to said predetermined trajectory, a main portion (100) having a first radial dimension (H') and a first transversal dimension (T, T') substantially constant along a radial direction and, in a radially outer position with respect to said main portion (100), a top portion (110) extending up to said radially outer surface of the tread band and having, at said radially outer surface of the tread band, a second transversal dimension (W) greater than said first transversal dimension (T, T').

25 Claims, 4 Drawing Sheets

(52) U.S. Cl.
CPC ... *B60C 11/1281* (2013.01); *B60C 2011/0341* (2013.01); *B60C 2011/1209* (2013.01)

(58) Field of Classification Search
CPC .............. B60C 11/1259; B60C 11/0304; B60C 11/0306; B60C 2011/1209; B60C 2011/0341
See application file for complete search history.

(56) References Cited

U.S. PATENT DOCUMENTS

| | | | | |
|---|---|---|---|---|
| 2009/0218020 | A1* | 9/2009 | Sumi | ................ B60C 11/12 152/209.18 |
| 2011/0120610 | A1* | 5/2011 | Fugier | ................ B60C 11/1218 152/209.21 |
| 2011/0155293 | A1 | 6/2011 | Berger et al. | |
| 2011/0290393 | A1 | 12/2011 | Berger et al. | |
| 2013/0206298 | A1* | 8/2013 | Guillermou | ......... B60C 11/1392 152/209.18 |
| 2016/0185162 | A1 | 6/2016 | Kaji | |

FOREIGN PATENT DOCUMENTS

| | | | | |
|---|---|---|---|---|
| FR | 3012767 | A1 * | 5/2015 | ............. B60C 11/12 |
| JP | 2000-211321 | | 8/2000 | |
| JP | 2005289124 | A * | 10/2005 | ......... B60C 11/1384 |
| JP | 2007-223493 | | 9/2007 | |
| JP | 2007223493 | A * | 9/2007 | ......... B60C 11/1281 |
| WO | WO-9948707 | A1 * | 9/1999 | ......... B29D 30/0606 |
| WO | WO 2012/164450 | A1 | 12/2012 | |

OTHER PUBLICATIONS

International Search Report form the European Patent Office in corresponding International Application No. PCT/IB2017/058342 dated Apr. 11, 2018.

Written Opinion of the International Searching Authority from the European Patent Office in corresponding International Application No. PCT/IB2017/058342 dated Apr. 11, 2018.

\* cited by examiner

TYRE FOR VEHICLE WHEELS

This application is a Section 371 national stage entry application based on PCT/IB2017/058342 filed Dec. 22, 2017, which claims priority to Italian Patent Application No. 102016000130965, filed Dec. 27, 2016; the contents of each application is incorporated herein by reference.

The present invention relates to a tyre for vehicle wheels, in particular for wheels of high and ultra-high performance vehicles.

The tyre of the invention is preferably a summer tyre. However, the invention can also be applied on a winter tyre or on a "all season" tyre (tyres capable of being used all year round).

High and ultra-high performance tyres, which are commonly defined as "UHP" tyres, are in particular those which allow speeds of over 200 km/h to be reached, up to and beyond 300 km/h. Examples of such tyres are those belonging to classes "H", "V", "W", "Y", according to the E.T.R.T.O. standard—(European Tyre and Rim Technical Organization) and racing tyres, in particular for high piston displacement four-wheeled vehicles. Typically, tyres belonging to such classes have a width in section equal to or greater than 185 mm, preferably comprised between 195 mm and 355 mm. Such tyres are preferably mounted on rims having fitting diameters equal to or greater than 16 inches, preferably not greater than 24 inches, more preferably comprised between 17 inches and 23 inches.

PRIOR ART

U.S. Pat. No. 8,544,512, EP 1782970 and JP 2000211321 describe examples of tyres for vehicle wheels with various geometries of sipes.

SUMMARY OF THE INVENTION

The term "equatorial plane" of the tyre is used to indicate a plane perpendicular to the rotation axis of the tyre.

The terms "radial" and "axial" and the expressions "radially inner/outer" and "axially inner/outer" are used with reference to the rotation axis of the tyre, whereas the terms "circumferential" and "circumferentially" are used with reference to the direction of the annular extension of the tyre, i.e. to the rolling direction of the tyre, which corresponds to a direction lying on a plane coinciding with or parallel to the equatorial plane of the tyre. In particular:

the term "radial direction" is used to indicate a direction substantially perpendicular to the rotation axis of the tyre;

the term "axial direction" is used to indicate a direction parallel to the rotation axis of the tyre, or inclined with respect to such an axis by an angle smaller than or equal to 45°;

the term "direction circumferential" is used to indicate a direction parallel to the rolling direction of the tyre, or inclined with respect to the rolling direction by an angle smaller than 45°.

The term "groove" is used to indicate a recess formed on the tread band of the tyre and having at least one portion having a width of at least 2 mm.

The term "circumferential groove" is used to indicate a groove extending along a circumferential direction.

The term "transversal groove" is used to indicate a groove extending along an axial direction.

The term "cross section of the tyre" is used to indicate a section of the tyre formed on a plane parallel to the equatorial plane.

The term "sipe" is used to indicate a thin notch formed in the tread band and extending along a trajectory defined by a single straight line or a curved line or by a broken line, wherein the term "broken line" is used to indicate a line comprising two or more consecutive straight and/or curvilinear lines which are inclined with respect to one another. In this context, in the present description, for greater clarity the sipe is described with reference both to the sipe formed on the tread band and to the portion of the mold adapted for obtaining it.

The sipe has, in a cross section of the tyre, a width not greater than 2 mm.

The term "longitudinal direction" of the sipe is used to indicate the main direction of extension of the sipe. In the case in which the sipe is defined by two mutually inclined parts of different length, the main direction of extension of the sipe is therefore that of the part of the sipe having a greater length.

The term "trajectory of the sipe" is used to indicate the path or the direction along which the sipe extends between two opposite axial ends thereof.

The term "cross section of the sipe" is used to indicate a section of the sipe formed on a plane perpendicular to the trajectory of the sipe.

The term "transversal dimension of the sipe" is used to indicate the width of the sipe measured in a cross section of the sipe taken at any point of the trajectory.

With reference to a sipe or to a portion thereof, the terms "widen" or "widening" and "narrow" or "narrowing" are used with reference to a cross section of the sipe. Therefore, a widening of the sipe results in an increase in the transversal dimension of the sipe, whereas a narrowing of the sipe results in a reduction of the transversal dimension of the sipe.

The term "radial dimension" of a sipe is used to indicate the extension (or width) of the sipe in the radial direction, i.e. the depth of the sipe.

The term "void to rubber ratio" is used to indicate the ratio between the overall surface of the grooves and of the sipes comprised in a certain portion of the tread pattern of the tyre intended for resting on the ground (possibly of the entire tread pattern) and the overall surface of the certain portion of tread pattern (possibly of the entire tread pattern).

Hereinafter, when values of angles are given they are considered as absolute values measured with respect to the equatorial plane.

The Applicant has observed that the transversal grooves and the sipes contribute to provide a tyre with the desired characteristics of traction and acceleration, in particular on wet or snow-covered road surfaces.

The Applicant has also observed that, particularly in summer tyres, in order to reduce the resistance to rolling and the noise of the tyre during rolling, it may be advantageous to reduce the number and the transversal dimension of the transversal grooves provided on the tread pattern.

The Applicant has realized that it is possible to obtain the desired reduction in resistance to rolling and noise by considering the provision of sipes, in particular at the central portion of the tread band.

The Applicant has however observed that the provision of sipes, particularly if they have a low width, can result in some drawbacks.

A first drawback is linked to the high risk of creating, at the sipe, a step on the surface of the tread band by means of a non-uniform wearing of the two edges defined by the sipe on the radially outer surface of the tread band. Such a step generates noise during rolling and, in the case of an asymmetric tyre, causes the tyre to have a different behavior in the two rolling directions. The Applicant believes that the aforementioned step is created by the fact that the small transversal dimension of the sipes results in the presence, at each of the aforementioned edges, of respective sharp edges. During rolling, the portion of tread band adjacent to the sipe that enters into the ground-contacting area first, squashes causing a lifting of the portion of tread band adjacent to the sipe that enters into the ground-contacting area thereafter. Such lifting causes the sharp edge defined at the latter portion of tread band to frontally impact the road surface, wearing much more than the other sharp edge.

A second drawback is linked to the fact that a tyre having a tread pattern in which part of the grooves is replaced by sipes having a low width can have a lower capability to be distinguished by the eyes of the users. This goes against the desire to make the tyre easily and quickly identifiable by the eyes of the users simply through the pattern of the tread band, so as to associate that particular model of tyre with a specific commercial brand.

The Applicant has found that it is possible to reduce the resistance to rolling and the noise of the tyre during rolling, while avoiding at the same time the drawbacks described above, making a sipe that, at the radially outer surface of the tread band, has a large transversal dimension, in particular equal or close to that typical of a groove and, at a radially inner portion thereof, a low transversal dimension.

In particular, the present invention relates to a tyre for vehicle wheels comprising a tread band comprising circumferential grooves.

Preferably, the tread band comprises circumferential ribs defined by said circumferential grooves.

Preferably, the tread band comprises a plurality of sipes that extend on said circumferential ribs.

Preferably, said sipes extend from a radially outer surface of the tread band towards a radially inner portion of the tread band.

Preferably, said sipes extend along a predetermined trajectory.

Preferably, said sipes comprise, in any cross section perpendicular to said predetermined trajectory, a main portion having a first radial dimension and a first transversal dimension substantially constant along a radial direction.

Preferably, said sipes comprise, in a radially outer position with respect to said main portion, a top portion extending up to said radially outer surface of the tread band.

Preferably, said top portion has, at said radially outer surface of the tread band, a second transversal dimension greater than said first transversal dimension.

The Applicant believes that the large transversal dimension of the sipe at the radially outer surface of the tread band causes the two radially outer edges of the sipe to be less sharp and the two portions of tread band defined by the sipe and adjacent to the latter to have a greater rigidity when entering into and exiting from the ground-contacting area, in this way reducing the risk that the aforementioned phenomenon of squashing of a portion of tread band and lifting of the other portion of tread band can occur, with consequent irregular wear of the two edges of the sipe. The large transversal dimension of the sipe at the radially outer surface of the tread band also makes it possible to give the tyre greater capability to be distinguished by the eyes of users and to facilitate the extraction of the sipe from the vulcanization mold.

The Applicant also believes that the small transversal dimension of the sipe at the main portion thereof makes it possible to uniformly discharge the deformations which the portion of tread band that is contacting the ground is subjected to, with consequent advantages in terms of traction, braking and acceleration.

Such a sipe thus combines the advantageous and desired properties of a transversal groove and of a conventional sipe.

Preferably, said top portion progressively widens continuously from said main portion of said sipe up to said radially outer surface of the tread band.

Preferably, said top portion extends substantially symmetrically on opposite sides with respect to a reference axis.

Preferably, said top portion comprises opposite side surfaces each of which is inclined, with respect to said reference axis, by an angle greater than, or equal to, about 5°.

Preferably, said top portion comprises opposite side surfaces each of which is inclined, with respect to said reference axis, by an angle smaller than, or equal to, about 25°.

In preferred embodiments, said top portion comprises opposite side surfaces each of which is inclined, with respect to said reference axis, by an angle comprised between about 5° and about 25°, the extreme values being included.

Preferably, said top portion has a second radial dimension smaller than said first radial dimension.

Preferably, the ratio between said first radial dimension and said second radial dimension is greater than, or equal to, about 2.

Preferably, the ratio between said first radial dimension and said second radial dimension is smaller than, or equal to, about 6.

In preferred embodiments, the ratio between said first radial dimension and said second radial dimension is comprised between about 2 and about 6, the extreme values being included.

Preferably, said sipe has an overall radial dimension greater than, or equal to, about 3 mm.

Preferably, said sipe has an overall radial dimension smaller than, or equal to, about 9 mm.

In preferred embodiments, said sipe has an overall radial dimension comprised between about 3 mm and about 9 mm, the extreme values being included.

Preferably, the ratio between said second radial dimension and said overall radial dimension is greater than, or equal to, about ⅙.

Preferably, the ratio between said second radial dimension and said overall radial dimension is smaller than, or equal to, about ¼.

In preferred embodiments, the ratio between said second radial dimension and said overall radial dimension is comprised between about ⅙ and about ¼, the extreme values being included.

Preferably, in first cross sections of said sipe the ratio between said second transversal dimension and said first transversal dimension is greater than, or equal to, about 3.

Preferably, in first cross sections of said sipe the ratio between said second transversal dimension and said first transversal dimension is smaller than, or equal to, about 12.

In preferred embodiments, in first cross sections of said sipe the ratio between said second transversal dimension and said first transversal dimension is comprised between about 3 and about 12, the extreme values being included.

Preferably, in second cross sections of said sipe the ratio between said second transversal dimension and said first transversal dimension is greater than, or equal to, about 2.

Preferably, in second cross sections of said sipe the ratio between said second transversal dimension and said first transversal dimension is smaller than, or equal to, about 6.

In preferred embodiments, in second cross sections of said sipe the ratio between said second transversal dimension and said first transversal dimension is comprised between about 2 and about 6, the extreme values being included.

Preferably, the value of the ratio between said second transversal dimension and said first transversal dimension in said second cross sections is smaller than the value of the ratio between said second transversal dimension and said first transversal dimension in said first cross sections.

Preferably, said sipe comprises, in any cross section perpendicular to said predetermined trajectory, a bottom portion arranged in a radially inner position with respect to said main portion.

Preferably, said bottom portion has a curved lower surface. Thanks to such a provision the risk that microlacerations can form on the portion of tread band arranged in a radially inner position with respect to the sipe is avoided, or substantially reduced. Indeed, during the rolling of the tyre, the sipes are subjected to a continuous opening and closing movement in the circumferential direction. Due to the small transversal dimension of the sipes, such a continuous movement causes a concentration of force on the bottom of the sipes that is variable over time, which, due to phenomena of mechanical fatigue, can lead to the formation of the aforementioned microlacerations. Such microlacerations can compromise the structural integrity of the tread band and, consequently, the quality of the tyre. The provision of a curved lower surface moreover does not compromise the functionality of the sipe in terms of traction, acceleration and running off of water.

Preferably, said bottom portion extends substantially symmetrically on opposite sides with respect to said reference axis.

Preferably, said lower surface is defined by a portion of circumference having a diameter greater than said first transversal dimension. Such a provision makes it possible to considerably reduce the fatigue force that concentrates in the bottom portion of the sipe, thus reducing to an equally considerable extent the risk of formation of the aforementioned microlacerations.

Preferably, the ratio between said diameter and said second transversal dimension is greater than, or equal to, about ½.

Preferably, the ratio between said diameter and said second transversal dimension is smaller than, or equal to, about 2.

In preferred embodiments, the ratio between said diameter and said second transversal dimension is comprised between about ½ and about 2, the extreme values being included.

Preferably, said bottom portion has a third radial dimension smaller than said first radial dimension.

Preferably, said sipe comprises opposite side wall portions that extend parallel to one another and that, in any cross section perpendicular to said predetermined trajectory, define said main portion.

Preferably, each of said opposite side wall portions comprises first side wall parts extending along a longitudinal direction parallel to said predetermined trajectory.

Preferably, each of said opposite side wall portions comprises second side wall parts that deviate from said longitudinal direction.

Preferably, each of said second side wall parts is arranged, along said longitudinal direction, between two successive first side wall parts.

Preferably, each of said second side wall parts defines in the respective side wall of said sipe a deformation that defines in the tread band two mutually embedding portions. Such embedding prevents, or substantially reduces, the mutual sliding of the two circumferentially adjacent portions of tread band separated by the sipe, in this way obtaining an improvement of the performance of the tyre in terms of lateral hold. Moreover, the provision of the aforementioned deformation on the main portion of the sipe, i.e. on a portion of sipe having a small transversal dimension, ensures that the embedding between the aforementioned circumferentially adjacent portions of tread band takes place immediately as soon as one of said portions of tread band enters into the ground-contacting area.

Preferably, two successive second side wall parts extend on opposite sides with respect to the first side wall part arranged between said two successive second side wall parts. Such a provision is particularly advantageous in non-directional tyres, wherein it is necessary to achieve the desired roadholding against lateral stresses coming both from the left and from the right with reference to the equatorial plane of the tyre.

Preferably, said deformation is polyhedron-shaped.

Preferably, said deformation comprises two opposite first side faces connected through two opposite second side faces.

Preferably, said two opposite second side faces join one to the other at an edge.

Preferably, said edge extends parallel to said predetermined trajectory.

Preferably, said two opposite first side faces are triangle-shaped.

Preferably, said two opposite second side faces are trapezium-shaped.

Preferably, said two opposite first side faces face to each other along said predetermined trajectory.

Preferably, said two opposite second side faces face to each other in radial direction.

Preferably, the inclination with respect to a radial plane of said two opposite first side faces is greater with respect to the inclination of said two opposite second side faces with respect to said radial plane. The side faces of the deformation are therefore more inclined along the axial direction of the tyre, which is the direction along which the lateral stresses act, in such a way offering a larger contrast surface to the aforementioned lateral stresses. The side faces of the deformation along the radial direction, on the other hand, have a smaller inclination, so as to facilitate the extraction of the sipe from the vulcanization mold.

Preferably, said predetermined trajectory is defined by a broken line.

Preferably, said broken line comprises two straight parts.

Preferably, said broken line comprises a first part and a second part inclined with respect to said first part by an angle comprised between about 90° and about 170°, the extreme values being included.

Preferably, said tread band has a low overall void to rubber ratio, that is lower than 0.3.

Preferably, the void to rubber ratio of the circumferential ribs is lower than 0.2.

BRIEF DESCRIPTION OF THE DRAWINGS

Further characteristics and advantages of the tyre of the present invention will become clearer from the following detailed description of some preferred embodiments thereof, made with reference to the attached drawings. In such drawings.

DETAILED DESCRIPTION OF EMBODIMENTS

Figure 1:
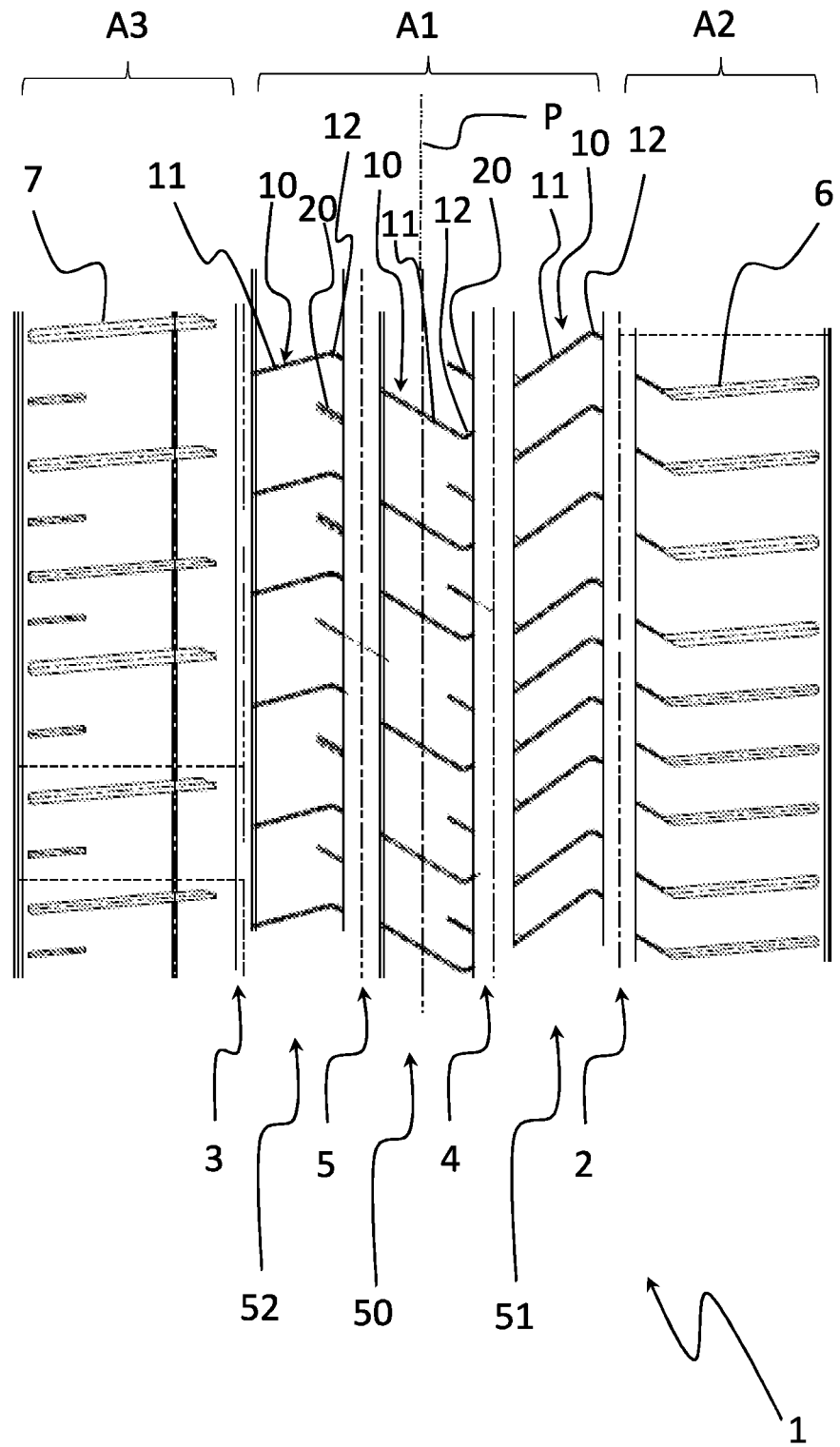
FIG. 1 shows a development in plan of a portion of the tread band of a tyre in accordance with the present invention.

In FIG. 1, reference numeral 1 wholly indicates a portion of an exemplary embodiment of a tread band of a tyre for vehicle wheels according to the present invention. In particular, it is a UHP summer tyre configured to be used in high and/or ultra-high performance four-wheeled vehicles.

The tread band 1 is made of elastomeric material.

The tread band 1 is arranged in a radially outer position with respect to a belt structure (not illustrated), which in turn is arranged in a radially outer position with respect to a carcass structure (not illustrated).

The tread band 1 comprises a central annular portion A1 arranged astride of an equatorial plane P of the tyre and two annular shoulder portions A2, A3, each of which is separated from the central annular portion A1 by a respective circumferential groove 2, 3.

In the embodiment of FIG. 1, the central annular portion A1 of the tread band 1 comprises two further circumferential grooves 4, 5 arranged on opposite sides with respect to the equatorial plane P. The circumferential grooves 4, 5 are thus axially arranged between the circumferential grooves 2, 3.

In the embodiment of FIG. 1, the annular shoulder portions A2, A3 comprise a plurality of transversal grooves 6, 7 extending substantially parallel to one another and inclined with respect to the equatorial plane P.

The central annular portion A1 of the tread band 1 comprises a plurality of sipes 10 axially extending from a radially outer surface of the tread band 1 towards a radially inner portion of the tread band 1.

Preferably, said tread band has a low overall void to rubber ratio, that is lower than 0.3.

Preferably, the void to rubber ratio of the circumferential ribs is lower than 0.2.

The sipes 10 can all have the same shape. In the embodiment of FIG. 1 they are substantially identical to one another.

One of the sipes 10 is illustrated in greater detail in FIGS. 2-7 and will be described hereinafter.

Figures 5A, 5B, 5C:
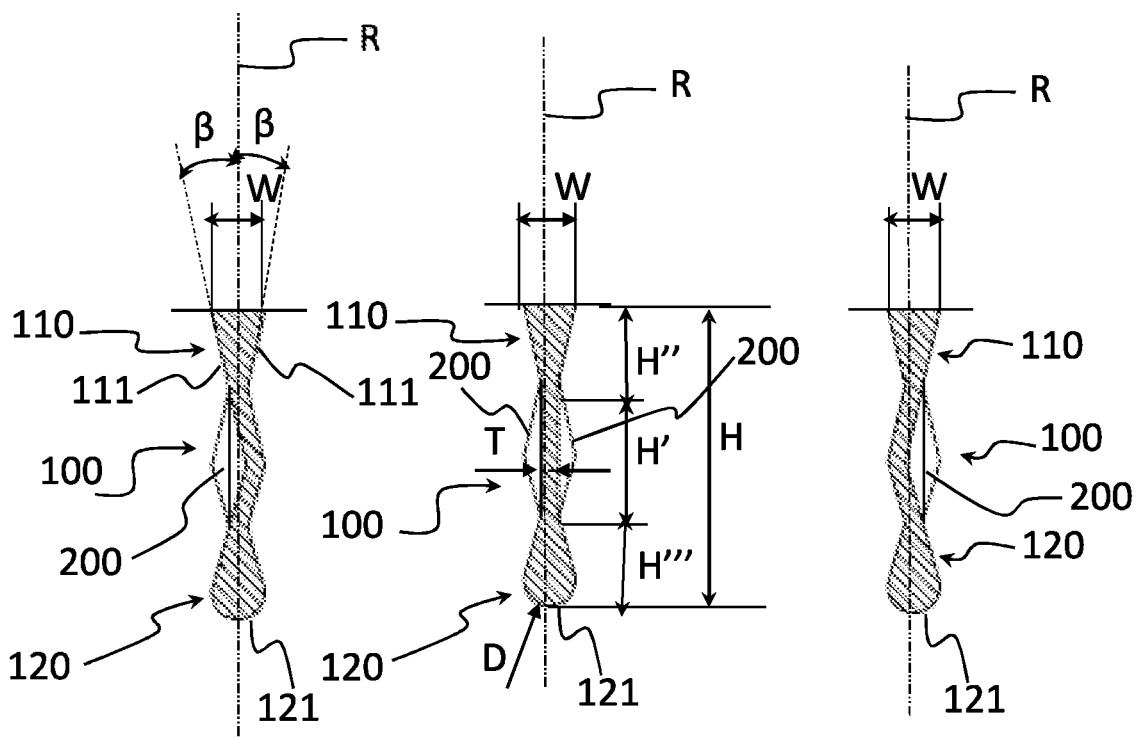
FIGS. 5a, 5b and 5c are schematic cross-sectional views of the sipe of FIG. 2 respectively taken in the planes of section 1-1, 2-2 and 3-3 of FIG. 4.

With reference to FIG. 5b, preferably, each sipe 10 has an overall radial dimension (or depth) H greater than, or equal to, about 3 mm, in any case lower than, or equal to, about 9 mm, for example comprised between 5 mm and 7 mm.

The sipes 10 are arranged on circumferential ribs defined by the circumferential grooves 2, 3, 4, 5. In particular, the sipes 10 are arranged in a central circumferential rib 50 and in two lateral circumferential ribs 51, 52 arranged on axially opposite sides with respect to the central circumferential rib 50.

The lateral circumferential rib 51 is separated from the central circumferential rib 50 by the circumferential groove 4.

The lateral circumferential rib 52 is separated from the central circumferential rib 50 by the circumferential groove 5.

The lateral circumferential rib 51 is axially arranged between the circumferential groove 2 and the circumferential groove 4 and the lateral circumferential rib 52 is axially arranged between the circumferential groove 3 and the circumferential groove 5.

For the sake of clarity of illustration, reference numeral 10 is associated with only one of the sipes of the central circumferential rib 50, with only one of the sipes of the lateral circumferential rib 51 and with only one of the sipes of the lateral circumferential rib 52.

Each sipe 10 extends in the respective central circumferential rib 50 or lateral circumferential rib 51, 52 between the two circumferential grooves that define such a circumferential rib. In particular, the sipes 10 of the central circumferential rib 50 extend from the circumferential groove 4 towards the circumferential groove 5, the sipes 10 of the lateral circumferential rib 51 extend from the circumferential groove 2 towards the circumferential groove 4 and the sipes 10 of the lateral circumferential rib 52 extend from the circumferential groove 3 towards the circumferential groove 5.

Each sipe 10 extends on a circumferential rib 50, 51, 52 along a predetermined trajectory that, in the embodiment of FIG. 1, is defined by a broken line comprising two substantially straight parts joined at a V-shaped vertex portion.

Figure 2:
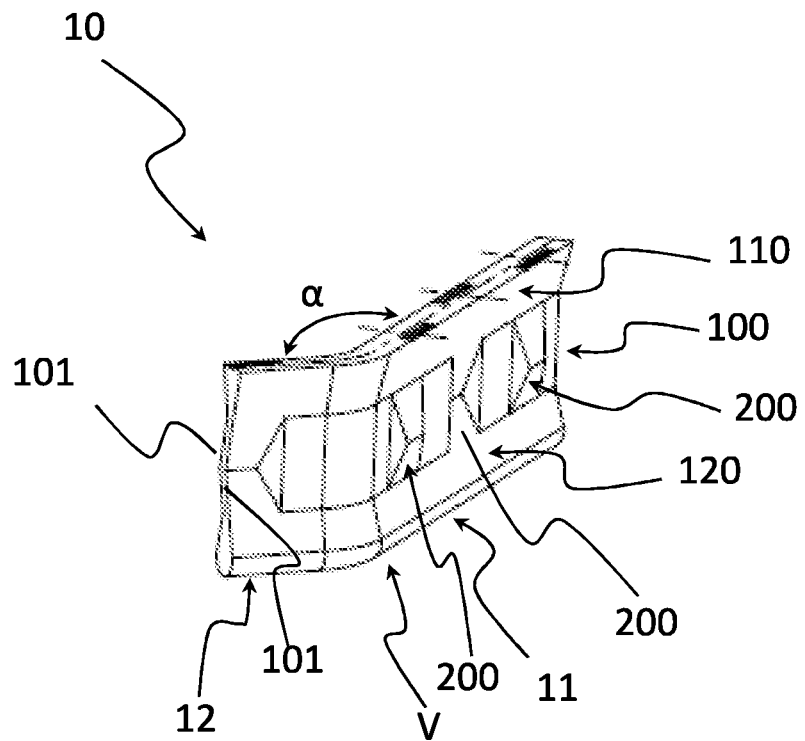
FIG. 2 is a schematic perspective view of an embodiment of a sipe used in the tread band of FIG. 1, such a sipe being seen from a first point of view.
Figure 3:
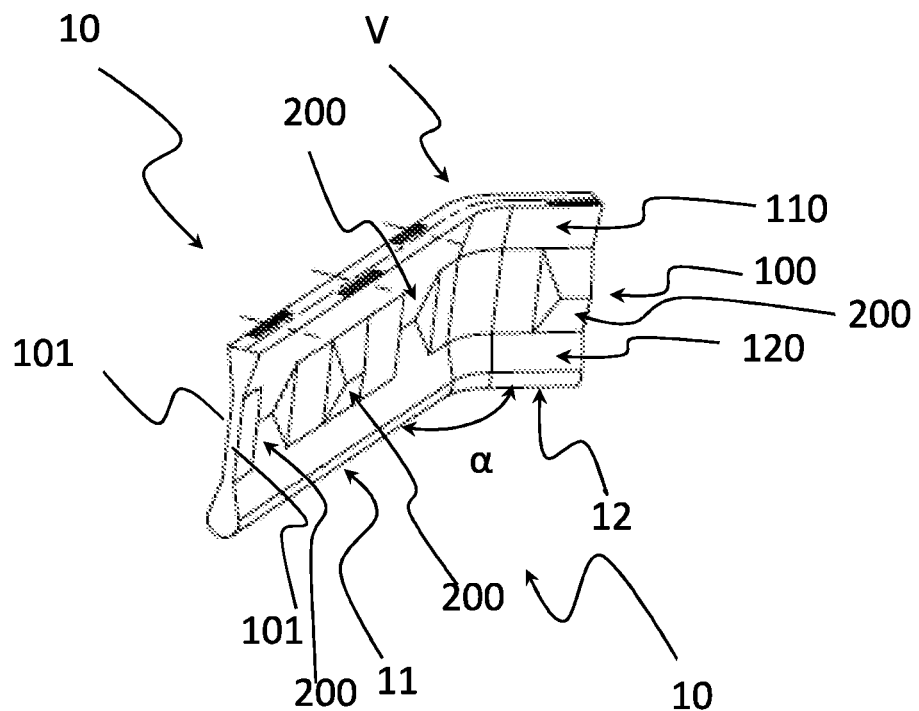
FIG. 3 is a schematic perspective view of the sipe of FIG. 2 seen from a different point of view.
Figure 4:
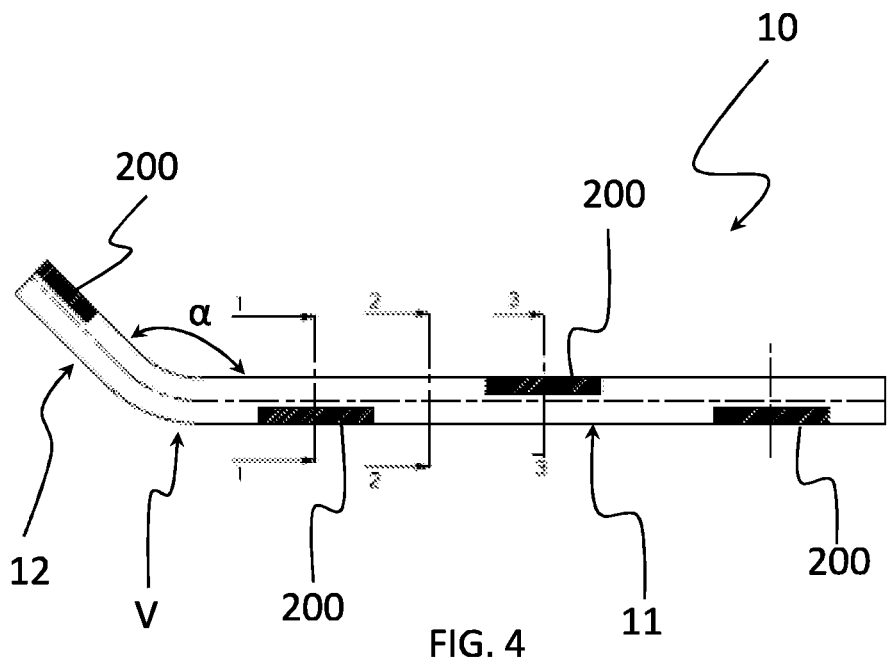
FIG. 4 is a schematic orthogonal view from above of the sipe of FIG. 2.

In particular, with reference to FIGS. 2-4, such a broken line comprises a longer first part 11 and a shorter second part 12 inclined with respect to the first part 11 by an angle $\alpha$ preferably comprised between about 90° and about 170°, the extreme values being included.

Preferably, the sipes 10 of each circumferential rib 50, 51, 52, although have an identical shape, can have a different orientation from that of the sipes 10 of the axially adjacent circumferential ribs.

With particular reference to FIGS. 2 and 3 and to the cross sections of FIGS. 5a, 5b, 5c, the sipe 10 comprises, in any cross section thereof, a main portion 100, a top portion 110 arranged in a radially outer position with respect to the main portion 100 and extending up to the radially outer surface of the tread band 1, and a bottom portion 120 arranged in a radially inner position with respect to the main portion 100.

With reference to the cross sections of FIGS. 5a, 5b and 5c, the top portion 110 and the bottom portion 120 extend substantially symmetrically on opposite sides with respect to a reference axis R. Such a reference axis R is defined in all of the cross sections of the sipe 10 by the middle plane of the sipe 10.

The main portion 100 has a radial dimension H' and a constant transversal dimension T in the radial direction, i.e. along the aforementioned radial dimension H'.

Preferably, the ratio between the overall radial dimension H and the radial dimension H' is comprised between about 2 and about 6, the extreme values being included.

In the embodiment illustrated herein, the ratio between the radial dimension H' and the overall radial dimension H is equal to about ½.

The top portion 110 has a radial dimension H" smaller than the radial dimension H'.

Preferably, the ratio between radial dimension H' and the radial dimension H" is comprised between about 2 and about 6, the extreme values being included.

In the embodiment illustrated herein, the ratio between the radial dimension H" and the overall radial dimension H is comprised between about ⅙ and about ¼.

The top portion 110 has, at the radially outer surface of the tread band 1, a transversal dimension W greater than the transversal dimension T of the main portion 100.

Preferably, the transversal dimension W is comprised between about 0.8 mm and about 2.5 mm, the extreme values being included, preferably between about 1.2 mm and about 2 mm.

In the embodiment of FIGS. 2-7, the top portion 110 progressively widens substantially continuously from the main portion 100 towards the radially outer surface of the tread band 1.

In particular, with reference to the cross section of FIG. 5a, the top portion 110 comprises, in all of the cross sections of the sipe 10, opposite side surfaces 111 each of which is inclined, with respect to the aforementioned reference axis R, by an angle β preferably comprised between about 5° and about 25°, the extreme values being included, preferably between about 10° and about 15°.

Figure 7:
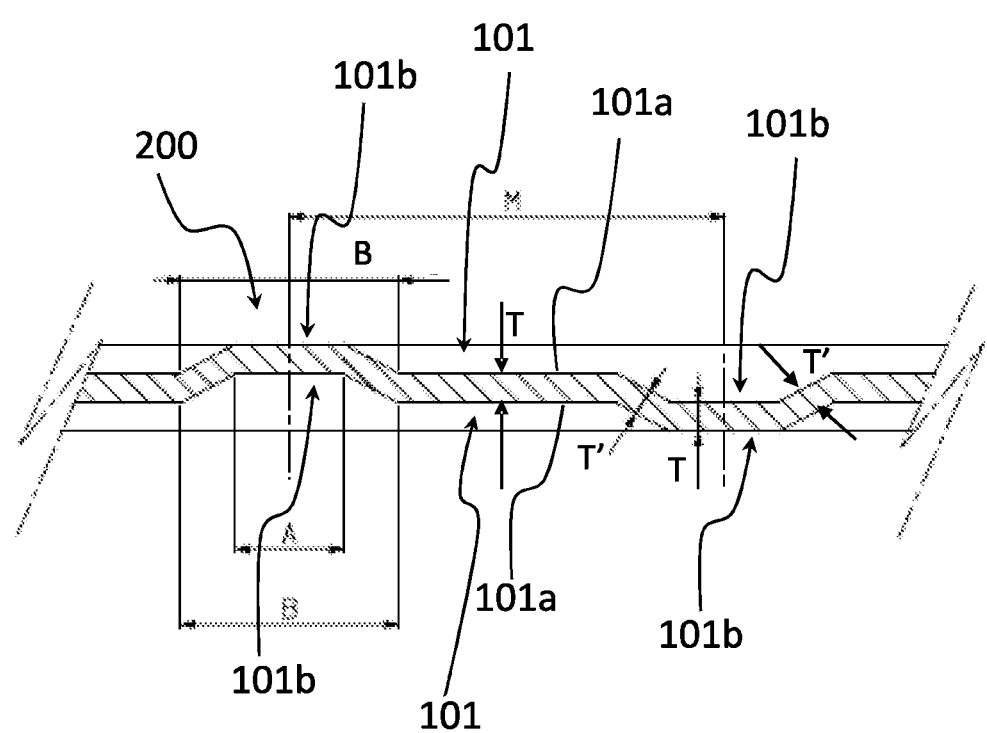
FIG. 7 is an enlarged schematic view of a longitudinal section of the sipe of FIG. 2 taken in the plane of section A-A of FIG. 6.

As illustrated in FIG. 7, and as also described hereinafter, the sipe 10 has, along the longitudinal extension thereof, cross sections in which the transversal dimension of the main portion 100 thereof is equal to a predetermined value T and cross sections in which the transversal dimension of the main portion 100 thereof is equal to a predetermined value T' smaller than, or equal to, T.

Preferably, the ratio between the transversal dimension W and the transversal dimension T is comprised between about 2 and about 6, the extreme values being included, preferably between about 2 and about 6.

Preferably, the ratio between the transversal dimension W and the transversal dimension T' is comprised between about 2 and about 12, the extreme values being included, preferably between about 3 and about 12.

In all of the cross sections of the sipe 10, the bottom portion 120 has a radial dimension (or depth) H'" smaller than the radial dimension H'.

Preferably, the ratio between the radial dimension H'" and the radial dimension H' is comprised between about ⅙ and about ½, the extreme values being included.

In the embodiment illustrated herein, the ratio between the radial dimension H'" and the overall radial dimension H is equal to about ¼.

The bottom portion 120 has a curved lower surface 121. In particular, the lower surface 121 is defined by a portion of circumference having a diameter D greater than the transversal dimension T.

Preferably, the ratio between the aforementioned diameter D and the transversal dimension W is comprised between about ½ and about 2, the extreme values being included.

In the embodiment illustrated herein, the aforementioned diameter D is equal to the transversal dimension W.

The main portion 100 of the sipe 10 can be suitably designed to ensure desired characteristics of traction, acceleration and braking, both on dry road surfaces and on wet or snow-covered road surfaces.

In the preferred embodiment illustrated in FIGS. 2-7, and with particular reference to FIG. 7, the sipe 10 comprises, in any cross section thereof and at the main portion 100 thereof, opposite side wall portions 101 that define the side walls of the aforementioned main portion 100.

Each portion of side wall 101 comprises respective first side wall parts 101a extending along the longitudinal direction of the sipe 10 and respective second side wall parts 101b that deviate from the aforementioned longitudinal direction and that define, in the main portion 100 of the sipe 10, respective deformations 200. The latter in turn define in the tread band 1 respective portions mutually embedding in the axial direction, suitably provided to obstruct the axial sliding between the two portions of tread band 1 separated by the sipe 10.

The deformations 200 are provided only on the main portion 100 of the sipe 10 and do not extend on the top portion 110 and the bottom portion 120 of the sipe 10.

In the embodiment illustrated herein, the second side wall parts 101b (and therefore the deformations 200) are arranged, along the longitudinal direction of the sipe 10, between two successive first side wall parts 101a. Moreover, two successive second side wall parts 101b (and therefore two successive deformations 200) extend on opposite sides with respect to the first side wall part 101a arranged between said two successive second side wall parts 101b.

Preferably, the deformations 200 all have the same shape and the same size.

In particular, in the embodiment of FIGS. 2-7, the deformations are polyhedron shaped.

Figure 6:
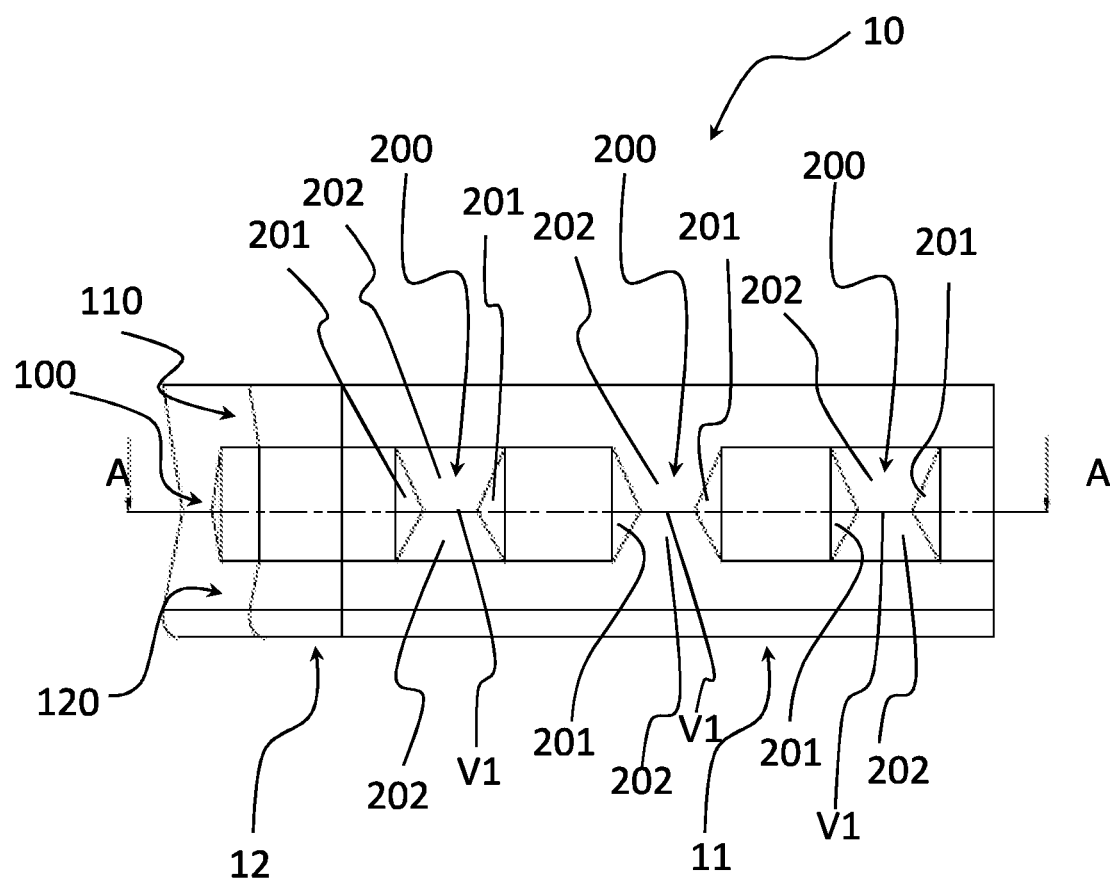
FIG. 6 is a schematic side view of the sipe of FIG. 2.

With particular reference to FIG. 6, each deformation 200 comprises two opposite first side faces 201 connected through two opposite second side faces 202.

Said two opposite first side faces 201 face to each other along the longitudinal direction of the sipe 10, whereas the two opposite second side faces 202 face to each other in the radial direction.

The two opposite first side faces 201 are more inclined than the opposite second side faces 202 with respect to a radial plane.

The two opposite first side faces 201 are triangle-shaped, whereas the two opposite second side faces 202 are trapezium-shaped and join to one another at an edge V1 that extends parallel to the longitudinal direction of the sipe 10.

With reference to FIG. 7, the edge V1 has a predetermined longitudinal extension A. Preferably, the ratio between the longitudinal extension A and the transversal dimension W is comprised between about 1 and about 6.

Each deformation 200 has an overall longitudinal extension B. Preferably, the ratio between the overall longitudinal extension B and the longitudinal extension A is comprised between about 1.5 and about 3.

The deformations 200 follow one another along the longitudinal direction of the sipe with a pitch M. Preferably, the ratio between the pitch M and the overall longitudinal extension B is comprised between about 1 and about 3.

The tread pattern illustrated in FIG. 1 is only an example of a large number of tread patterns which can be actually made according to the specific requirements. In particular, the number of sipes, of transversal grooves, of circumferential grooves, of circumferential ribs, of sipes belonging to each rib, the circumferential position of the sipes of one rib with respect to that of the sipes of the axially adjacent rib(s) can vary according to the specific use foreseen for the tyre, thus obtaining a tread pattern different from the one illustrated in FIG. 1 but always being within the scope of protection defined by the following claims.

Tread patterns with circumferential and transversal grooves of shape and/or size different from those described above with reference to FIG. 1 can also be foreseen.

Of course, one skilled in the art can bring further modifications and variants to the invention described above in order to satisfy specific and contingent application requirements, said variants and modifications in any case being within the scope of protection as defined by the following claims.

The invention claimed is:

1. A tyre for vehicle wheels, comprising a tread band comprising:
   circumferential grooves,
   circumferential ribs defined by the circumferential grooves, and
   a plurality of sipes extending, on the circumferential ribs, from a radially outer surface of the tread band towards a radially inner portion of the tread band;
   wherein the sipes extend along a predetermined trajectory and comprise, in any cross section perpendicular to the predetermined trajectory:
      a main portion having a first radial dimension (H') and a first transversal dimension (T, T') substantially constant along a radial direction, and a top portion arranged in a radially outer position with respect to the main portion, the top portion extending up to the radially outer surface of the tread band and having, at the radially outer surface of the tread band, a second transversal dimension (W) greater than the first transversal dimension (T, T');
   wherein the sipe further comprises opposite side wall portions extending parallel to one another and that, in any cross section perpendicular to the predetermined trajectory, define the main portion, wherein each of the opposite side wall portions comprises:
      first side wall parts extending along a longitudinal direction parallel to the predetermined trajectory, and
      second side wall parts that deviate from the longitudinal direction, each of the second side wall parts arranged, along the longitudinal direction, between two successive first side wall parts and defining, in the respective side wall of the sipe, a deformation that defines two mutually interlocking portions in the tread band;
   wherein the deformation extends only in the main portion of the sipe and not in the top portion of the sipe,
      wherein each of the second side wall parts comprises a first portion and two opposite second portions arranged on opposite sides with respect to the first portion; and
   wherein a ratio of the second transversal dimension (W) to the first transversal dimension (T) in a cross section of the sipe taken at the first side wall parts is equal to the ratio of the second transversal dimension (W) to the first transversal dimension (T) in a first cross section of the sipe taken at the first portions of the second side wall parts and smaller than the ratio of the second transversal dimension (W) to the first transversal dimension (T') in a second cross section of the sipe taken at the second portions of the second side wall parts.

2. The tyre according to claim 1, wherein the top portion progressively widens continuously from the main portion of the sipe up to the radially outer surface of the tread band.

3. The tyre according to claim 1, wherein the top portion extends substantially symmetrically on opposite sides with respect to a reference axis (R).

4. The tyre according to claim 3, wherein the top portion comprises opposite side surfaces, each of which is inclined with respect to the reference axis (R), by an angle (β) ranging from about 5° to about 25°.

5. The tyre according to claim 1, wherein the top portion has a second radial dimension (H") smaller than the first radial dimension (H') of the main portion.

6. The tyre according to claim 5, wherein a ratio of the first radial dimension (H') to the second radial dimension (H") ranges from about 2 to about 6.

7. The tyre according to claim 1, wherein the sipe has an overall radial dimension (H) ranging from about 3 to about 9 mm.

8. The tyre according to claim 7, wherein a ratio of the a second radial dimension (H") of the top portion to the overall radial dimension (H) ranges from about ⅙ to about ¼.

9. The tyre according to claim 1, wherein in the second cross section of the sipe, a ratio of the second transversal dimension (W) to the first transversal dimension (T') ranges from about 3 to about 12.

10. The tyre according to claim 1, wherein in the first cross section of the sipe, a ratio of the second transversal dimension (W) to the first transversal dimension (T) ranges from about 2 to about 6.

11. The tyre according to claim 1, wherein the sipe further comprises, in any cross section perpendicular to the predetermined trajectory, a bottom portion arranged in a radially inner position with respect to the main portion and having a curved lower surface.

12. The tyre according to claim 11, wherein the bottom portion extends substantially symmetrically on opposite sides with respect to a reference axis (R).

13. The tyre according to claim 11, wherein the lower surface is defined by a portion of circumference having a diameter (D) greater than the first transversal dimension (T, T').

14. The tyre according to claim 13, wherein a ratio of the diameter (D) to the second transversal dimension (W) ranges from about ½ to about 2.

15. The tyre according to claim 11, wherein the bottom portion has a third radial dimension (H''') smaller than the first radial dimension (H') of the main portion.

16. The tyre according to claim 1, wherein two successive second side wall parts extend from opposite sides with respect to the first side wall part and the first side wall part is arranged between the two successive second side wall parts.

17. The tyre according to claim 1, wherein the deformation is polyhedron-shaped.

18. The tyre according to claim 1, wherein the deformation comprises two opposite first side faces connected through two opposite second side faces.

19. The tyre according to claim 18, wherein the two opposite second side faces join one to the other at an edge that extends parallel to the predetermined trajectory.

20. The tyre according to claim 18, wherein the two opposite first side faces are triangle-shaped and the two opposite second side faces are trapezium-shaped.

21. The tyre according to claim 18, wherein the two opposite first side faces face each other along the predetermined trajectory and the two opposite second side faces face each other in the radial direction.

22. The tyre according to claim 21, wherein an inclination with respect to a radial plane of the two opposite first side faces is greater than an inclination of the two opposite second side faces with respect to the radial plane.

23. The tyre according to claim 1, wherein the predetermined trajectory is defined by a broken line comprising two rectilinear parts.

24. The tyre according to claim 23, wherein the broken line comprises a first part and a second part inclined with respect to the first part by an angle ranging from about 90° to about 170°.

25. A tyre for vehicle wheels, comprising a tread band comprising:
- circumferential grooves,
- circumferential ribs defined by the circumferential grooves, and
- a plurality of sipes extending, on the circumferential ribs, from a radially outer surface of the tread band towards a radially inner portion of the tread band;
- wherein the sipes extend along a predetermined trajectory and comprise, in any cross section perpendicular to the predetermined trajectory:
  - a main portion having a first radial dimension (H') and a first transversal dimension (T, T') substantially constant along a radial direction, and a top portion arranged in a radially outer position with respect to the main portion, the top portion extending up to the radially outer surface of the tread band and having, at the radially outer surface of the tread band, a second transversal dimension (W) greater than the first transversal dimension (T, T');
- wherein the sipe further comprises opposite side wall portions extending parallel to one another and that, in any cross section perpendicular to the predetermined trajectory, define the main portion, wherein each of the opposite side wall portions comprises:
  - first side wall parts extending along a longitudinal direction parallel to the predetermined trajectory, and
  - second side wall parts that deviate from the longitudinal direction, each of the second side wall parts arranged, along the longitudinal direction, between two successive first side wall parts and defining, in the respective side wall of the sipe, a deformation that defines two mutually interlocking portions in the tread band;
- wherein the deformation extends only in the main portion of the sipe and not in the top portion of the sipe;
- wherein the deformation comprises two opposite first side faces connected through two opposite second side faces, wherein the two opposite second side faces join one to the other at a linear edge (V1) that extends parallel to the predetermined trajectory, wherein the two opposite first side faces are triangle-shaped and the two opposite second side faces are trapezium-shaped.

* * * * *